United States Patent [19]
Corbett et al.

[11] Patent Number: 5,341,435
[45] Date of Patent: Aug. 23, 1994

[54] SYSTEM FOR DETECTION AND RECOGNITION OF AN OBJECT BY VIDEO IMAGING MEANS

[75] Inventors: Kenneth A. Corbett, Huntsville; David R. Anderson, Arab, both of Ala.

[73] Assignee: Corbett Technology Company, Inc., Huntsville, Ala.

[21] Appl. No.: 854,471

[22] Filed: Mar. 17, 1992

[51] Int. Cl.$^5$ .................................................. G06K 9/00
[52] U.S. Cl. ............................................. 382/1; 382/17; 382/43; 348/169
[58] Field of Search ............... 382/1, 17, 43, 48, 10; 364/726, 724.01, 724.04, 724.08, 724.11; 342/196, 192, 90, 179; 358/125; 348/169

[56] References Cited

U.S. PATENT DOCUMENTS

| | | | |
|---|---|---|---|
| 4,266,279 | 5/1981 | Hines | 364/726 |
| 4,389,647 | 6/1983 | Fanuele et al. | 342/192 |
| 4,490,851 | 12/1984 | Gerhart et al. | 382/43 |
| 4,630,051 | 12/1986 | Adams et al. | 342/192 |
| 4,719,606 | 1/1988 | Andrieu | 342/192 |
| 4,842,247 | 6/1989 | Kürbitz et al. | 250/342 |

Primary Examiner—Joseph Mancuso
Assistant Examiner—Steven P. Klocinski
Attorney, Agent, or Firm—John C. Garvin, Jr.; Harold W. Hilton

[57] ABSTRACT

Apparatus for detecting and identifying, by video imagery, an object such as a helicopter, having a characteristic temporal signature containing phase and magnitude information. The object is acquired and the video signals are stored and then temporally filtered by a FFT on a pixel to pixel basis. The magnitude and phase of pixel at a predetermined frequency is determined and compared with periodic frequencies generated by known objects, such as helicopter rotors, to determine if the frequency generated by the object matches any of the known frequencies. Further processing determines the number of blades and directions of rotation of the blades which removes ambiguities from frequency only processing.

7 Claims, 7 Drawing Sheets

SYSTEM FOR DETECTION AND RECOGNITION OF AN OBJECT BY VIDEO IMAGING MEANS

FIELD OF THE INVENTION

A system using video imagery to detect and identify an object by analyzing discriminating characteristics relative to the object. More specifically, the invention is directed to a system for recognizing and identifying an object such as a helicopter by analyzing the temporal signature produced by the helicopter rotor modulation.

BACKGROUND OF THE INVENTION

This invention is directed to a system for detecting and recognizing (distinguishing) an object in space from objects of similar characteristics (intensity, background noise, etc.) within the receiving aperture of video imaging devices. The system provides for detecting and/or identifying cyclic (periodic) modulation in video imagery of sufficient resolution to retrieve a positive signal to noise ratio.

The system of the present invention finds applications in such areas as searching for objects having emissions or transmissions of periodic variations such as those provided by pulsars in astronomical data such as data from the Hubble Space telescope. A second application of the system of the present invention is in the detection and location of beacons from downed aircraft or ships in trouble. Such detection and location functions being a necessary part of air, land, and sea rescue operations. A third applicaton of the system of the present invention is the detection, recognition and location of identificaton friend or foe (IFF) beacons from ground, sea, or air vehicles. Such IFF application could include specific temporal modulations whose signal to noise is enhanced by utilizing the principles of the present invention thus permitting a reduced amplitude beacon to help preserve covertnous of the vehicle from the opposing forces.

Apparatus and method of the system of the present invention has particular application to helicopters or other cyclic (rotary) modulation detection by providing means for improving discrimination against random noise.

A global application for the system described herein is in defense related functions such as the detection of enemy threats provided by air, land, or water vehicles and identifying these vehicles to determine if they are friends or foe.

While the system of the present invention finds application in many areas, as discussed supra, the principles of the present invention as set forth herein will be discussed specifically (as by way of example) in conjunction with the recognition and identification of helicopters. The system must first identify that its perceived target is a helicopter and then must identify the type of helicopter such as HIND, APACHE, etc. for appliction to the IFF processes.

Typically, detection and identification systems that use imaging or pseudo imaging techniques are based principally on spatial features of the target system rather than using temporal features. Such spatial systems tend to have very high false alarm rates and poor range performance for selection, recognition, and identification.

The system of the present invention uses the temporal signature of the helicopter to detect the helicopter and identify the type of helicopter. The temporal signature consisting of the helicopter rotor modulation is substantially unique to each type of helicopter and it produces a signal to noise ratio when filtered that is detectable and recognizable.

Previous work sponsored by the Government was limited to helicopter rotor modulation detection using the magnitude signal from a Fast Fourier Transform (FFT) filter. This work, using magnitude only was pursued to a point and a basic algorithm was defined.

Additional investigations by applicants have verified that the phase signal from the FFT filter contained intelligence relating to rotor modulation signature. The present invention describes means for using this intelligence from the phase signal to enhance the signal to noise ratio during the detection process and hence reduce the false alarm rate.

During later development work applicant demonstrated in a "proof of principle" procedure that the helicopter rotor modulation frequencies could be isolated beyond just a bin bandwidth capabilities of the FFT filter as was used in previous work to provide a detection/identification process.

It is, therefore, an object of the present invention to provide a system for visual detection of an object by visual imagery techniques.

It is further object of the present invention to provide such a system which is not only capable of such detection but also has the capability of recognizing and identifying such an object.

It is yet a further object of the present invention to provide such a system wherein the object is a helicopter.

It is still yet a further object of the present invention to provide such system with means to analyze the helicopter rotor modulation signal to determine or identify such helicopter for application to IFF.

DESCRIPTION OF THE PREFERRED EMBODIMENT

The detection and recognition system of the present invention utilizes an algorithm (FIG. 6) that permits the use of a Fast Fourier Transform (FFT), a Digital Fourier Transform (DFT), or a Finite Response (FIR) filter to perform the detection process of a potential enemy helicopter and to provide a means to detect/identify the helicopter to prioritize the threat for counter fire and to provide data for non-cooperative identification friend or foe.

The invention utilizes the phase output parameters from a FFT, DFT, or FIR filter to provide more accurate and exacting frequency selection and in so doing, reduces the noise bandwidth to improve detection signal to noise ratio. Through simulation and test measurements, it was discovered that the difference between successive FFT phase functions rotates progressively for each center frequency of the FFT.

In the algorithm for the 16 point FFT for example, the phase of the center frequency progresses through each bin. Variation of the modulation frequency from the center frequency in each bin produces a phase difference whose average is shifted from the phase difference of the center frequency. The utilization of this shifted phase difference from the center frequency provides a means for detection and identification of an object in accordance with the principles of the present invention (see FIG. 6).

Placing limits around the phase difference corresponding to the target of interest reduces noise and hence can reduce the false alarm rate (FAR) during the detection process and provide the frequency basis of recognition/identification of the target.

Figure 6:
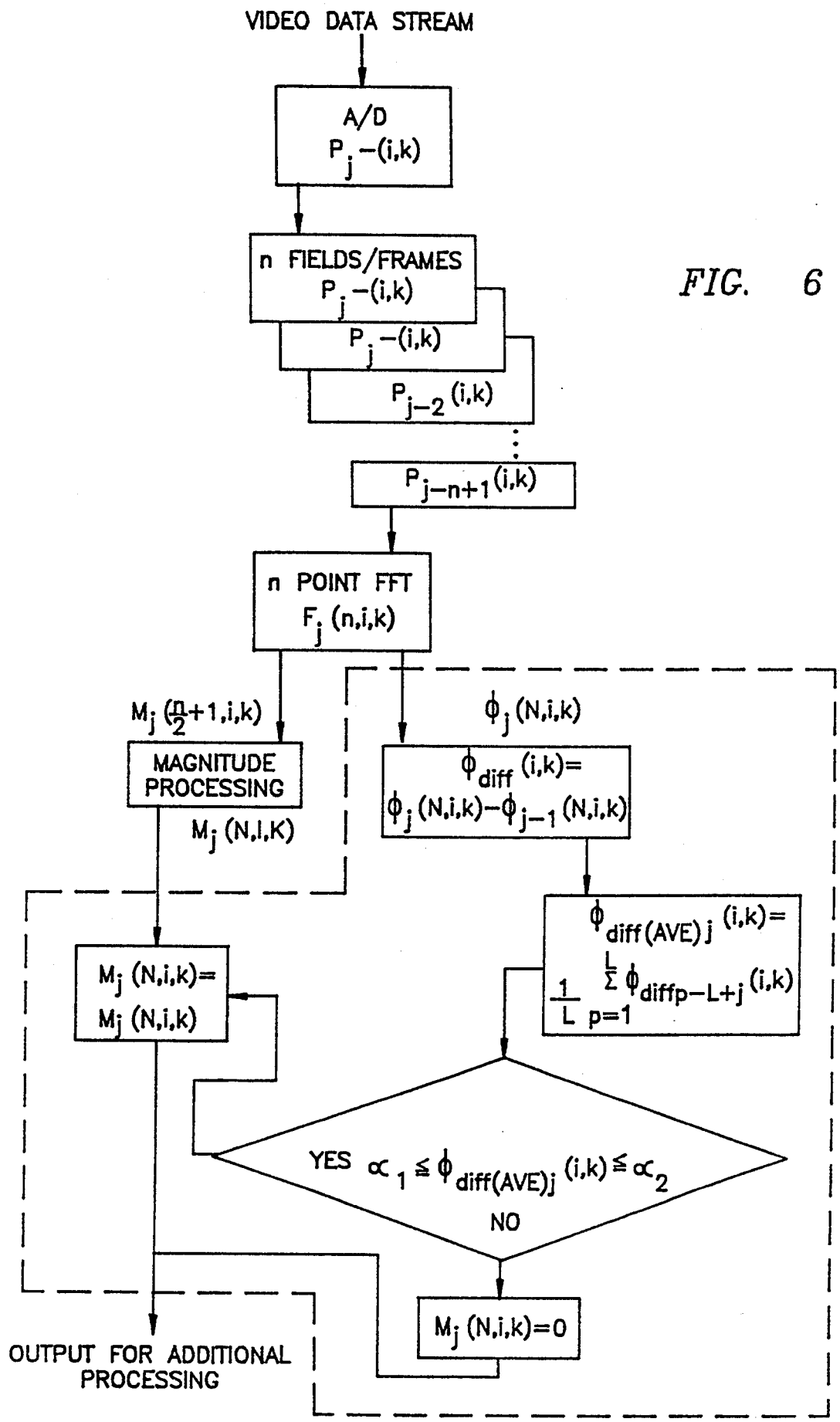
FIG. 6 illustrates the detection and identification algorithm which sets forth the steps used in carrying out the principles of the present invention.

It was determined that in many cases, interlaced video data can be processed on a field by field basis which doubles the effective sampling frequency for the filter with very little loss in signal over the results achieved by processing on a frame by frame basis. That is why the diagram of FIG. 6 shows fields and frames as alternatives.

Given a video data stream such as RS-170 video, the required number of frames or fields, n, of video equal to the number of points defined for the filter (FFT) are stored and a temporal filter (FFT) is executed on a pixel by pixel basis. Such FFT's are well known in the art. One example of such an FFT is provided in the form of a chip manufactured by TRW (part number 2310). Another example of such a chip is one provided by Array MicroSystems (part numbers A66111 and A66211). The magnitude of the pixel at the frequency of interest (The output frequency of the object or target) is defined as $M_j(N,i,k)$ and the phase of the pixel is defined as $\phi_j(N,i,k)$ where j is the current frame or field number (The most recent frame or field received from the video), i is the column number of the pixel, k is the row number of the pixel in the image, N is the frequency of the bin of interest, and n/2+1 is the number of FFT frequency bins inclusive of DC and the nyquist frequency. Bins from n/2+2 to n duplicate information to those below nyquist.

The current phase difference $\phi_{diff_j}(N,i,k)$ (The most recently calculated phase difference and is derived from the stored frames including the most recently stored frame) is calculated by subtracting the resulting phase of the pixel from the previous sample, $\phi_{j-1}(N,i,k)$, from the phase of the pixel of the current sample, $\phi_j(N,i,k)$. It was found to be more effective to calculate a phase difference average, either using a box car average as shown in FIG. 6 or some other weighted average as described hereinbelow. However, the $\phi_{diff_j}(i,k)$ can be set equal to $\phi_{diff(AVE)_j}(i,k)$ with some loss of performance. $\phi_{diff(AVE)_j}(i,k)$ as shown in the block diagram (FIG. 6) is calculated as the sum over L pixel phase differences, $\phi_{diff_{p-L+j}}(i,k)$, divided by L ($\phi_{diff(AVE)_j}(i,k)$ may also be utilized for further filtering by itself).

A phase-magnitude comparison is done and if $\phi_{diff(AVE)_j}(i,K)$ is between limits $\propto 1$ and $\propto 2$ the processed magnitude of the pixel, $M_j(N,i,k)$, is passed for further discrimination. If it is not between the limits, $M_j(N,i,k)$ is set to zero.

Figure 1:
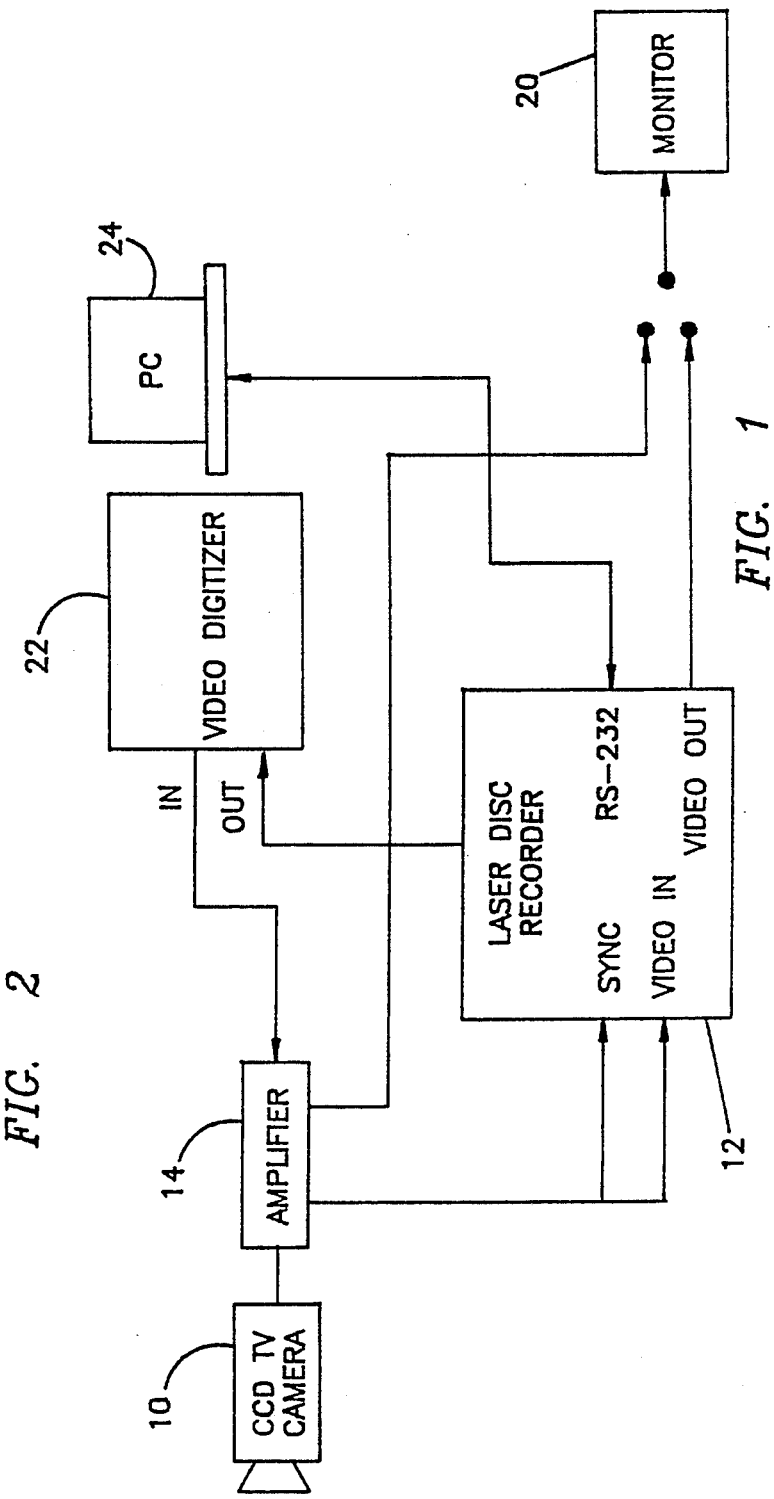
FIG. 1 is a block diagram illustrating apparatus for carrying out the process of detection and recognition of an object in accordance with the principles of the present invention.
Figure 2:
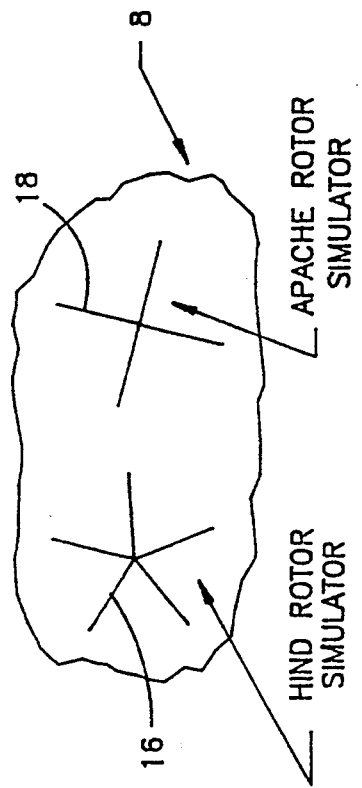
FIG. 2 is a diagrammatic illustration of a helicopter simulator structure used in conjunction with the apparatus of FIG. 1 to carry out the principles of the present invention.

FIG. 2 is a block diagram illustrating structure which was assembled to provide a proof of principle of the present invention. A rotor simulator 8 was constructed as shown in FIG. 2 and TV video was recorded from the simulator using a TV camera 10 (FIG. 1) to input to a laser disk recorder 12 through an amplifier 14. One rotor 16 in the simulator was made to scale to simulate a Soviet Mi-24 Hind helicopter and a second rotor 18 simulated a US AH-64 Apache. The 5 blade rotor simulating the Hind helicopter was turned at 236 RPM which yielded a 19.7 Hz modulation frequency and it was made to turn in the Russian direction (clockwise) looking from above. The 4 blade rotor 18 which simulated the Apache was rotated counter clockwise (conventional direction) at 286 RPM or at a modulation frequency of 19.1 Hz.

The data was recorded with camera 10 above the plane of the rotors (approximately 6 degree look down angle). A monitor 20 was used by an operator to evaluate the data.

The video was recorded on laser disk recorder 12 and processed one frame at a time as illustrated in FIG. 6. Eight frames (16 fields) were initially digitized one frame at a time with the video digitizer 22 under control of a PC 24. Then a sixteen point FFT was calculated on a pixel by pixel basis over the 242 rows by 512 columns per field in the software by the PC.

A magnitude comparison was performed and if the magnitude of the frequency bin of interest (18.75 Hz in this case) was the largest of the remaining frequencies (3.75, 7.5, 11.25, 15, 22.5 and 26.25 Hz) and larger than ½ the magnitude of the Nyquist frequency (30 Hz), the pixel was retained. If not, the pixel magnitude was set to zero.

The phase of the pixel was also calculated in software by the PC. The phase of the current sample was subtracted from the phase of the preceding sample and processed through a weighted average algorithm on a pixel by pixel basis. If the weighted average of the phase difference was within limits (i.e.: between 1 and 2 in FIG. 6), the pixel magnitude was retained. If not, the pixel magnitude was set to zero. The resulting $242 \times 512 = 123{,}904$ magnitude values, many having been set to zero by the algorithm were stored on the PC hard disk. The current phase and the current phase difference weighted average were also stored for the text frame calculation.

It was desirable to bound the phase difference by imposing the following condition: If the phase difference is greater than or equal to 180 degrees, then subtract 180 degrees from the phase difference. If the phase difference is less than or equal to −180 degrees, then add 180 degrees to the phase difference. If the phase difference is now less than 0 degrees, add 180 degrees again. This confines the phase difference between 0 and 180 degrees, which results in phase averages with small variances.

The phase difference weighted average function employed here is a geometric series as follows wherein a is a positive value less than one such that the geometric series will converge. q is the number of samples starting at 1 and going until the filter is reset, it is also the total number of samples. L is an arbitrary number of samples over which the average is taken. P is the sample over which the average is taken, P goes from 1 to L.

$$\phi diff(\text{AVE})(i,k) = a \sum_{j=1}^{q} (1-a)^j \phi diff(\text{AVE})j \text{ where } j = 1, q \text{ and } a < 1.$$

For this example, $a = \frac{1}{8}$. The weighted average function was used because it reduces memory and computational requirements.

The next frame was then digitized and above described process was continued for the number of frames (60 to 90) chosen to illustrate the algorithm performance.

A simulation of the rotor modulation was constructed to determine the average phase difference parameters. For the Hind, the average phase difference was determined to be 58 degrees. $\propto 1$ was set to 54 degrees and $\propto 2$ was set to 62 degrees which provided good results. For the Apache, the average phase was determined to be 48 degrees and $\propto 1$ was set to 44 degrees with $\propto 2$ set to 52 degrees.

After the magnitude and phase difference comparisons, the resulting data was passed through a spatial filter. The spatial filter calculates the average pixel magnitude for a box that is 4 pixels high by 8 pixels wide. Since the rotor modulation occupies an area larger than the above specified box, the effect of the spatial filter is to suppress single pixel noise spikes while maintaining the magnitude of the rotor. For the example given, the pixels are processed through the time average function defined by the geometric series above to further reduce noise. The results were stored on the PC hard disk.

Investigations have indicated that thresholding before and after an average such as the geometric series yields further reduction in false alarms and produces results that permit automatic target detection and recognition/identification.

One processed frame at a time was recorded onto the laser disk recorder 12 via the video digitizer interface 22 and amplifier 14 in sequence for playback. In order to provide a complete 512 line display, the second field is created by duplicating the stored results field. The monitor 20 was used to display the data.

A final part of the algorithm development resulted in being able to determine the direction of rotation and the number of rotor blades. The above described algorithm was used to produce the ability for the operator to discriminate rotor frequency, direction and number of blades. The algorithm change that allows direction and number of blade discrimination is the above described algorithm with the phase parameter $\propto 1$, set to 26 degrees and $\propto 2$ set to 90 degrees for the HIND and with the average function deleted.

A stroboscopic action was produced that caused the appearance of blades being stopped so that pattern recognition algorithms can be used to count blades. By shifting the $\propto 1$ and $\propto 2$ parameters up or down together slightly, the appearance of slow blade rotation occurs. This can be used alternatively with the simple blade rotation direction algorithm described herein.

The camera 10 used in the above process was a Fairchild CCD TV camera. The laser disk recorder 12 was a Panasonic Model TQ-2020F. The PC 24 was a PC-386 Northgate (25 MHz). The video digitizer 22 a Chorus Data Systems digitizer—Model 1530. The Monitor 20 was a Panasonic, Model WV-5380 Monitor.

Figure 3:
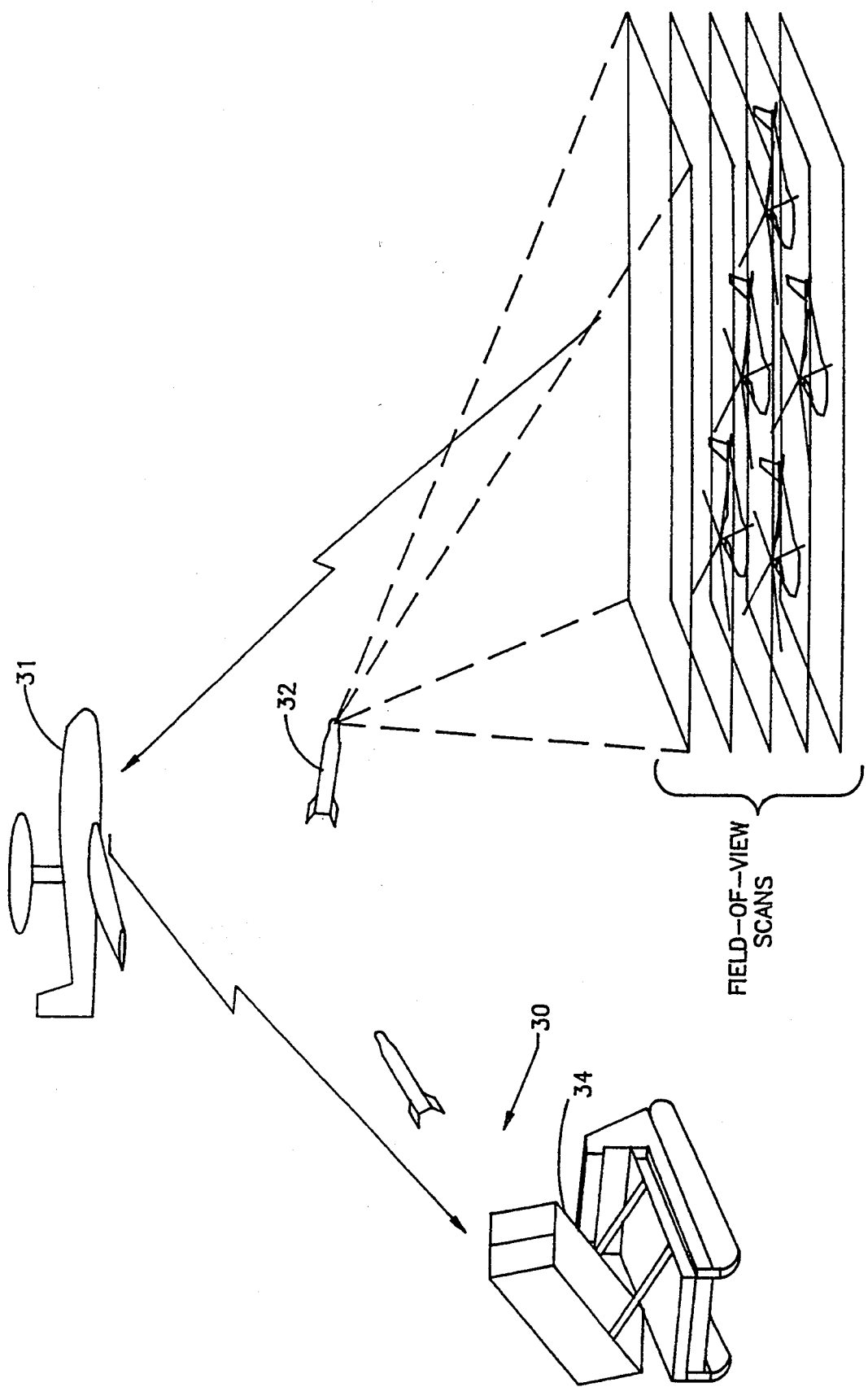
FIG. 3 is a diagrammatic view illustrating a missile visually acquiring a target (helicopter) in accordance with the principles of the present invention. The figure illustrates an autonomous system which utilizes an aircraft to provide the missile launcher with information relating to helicopter altitude and movement.
Figure 4:
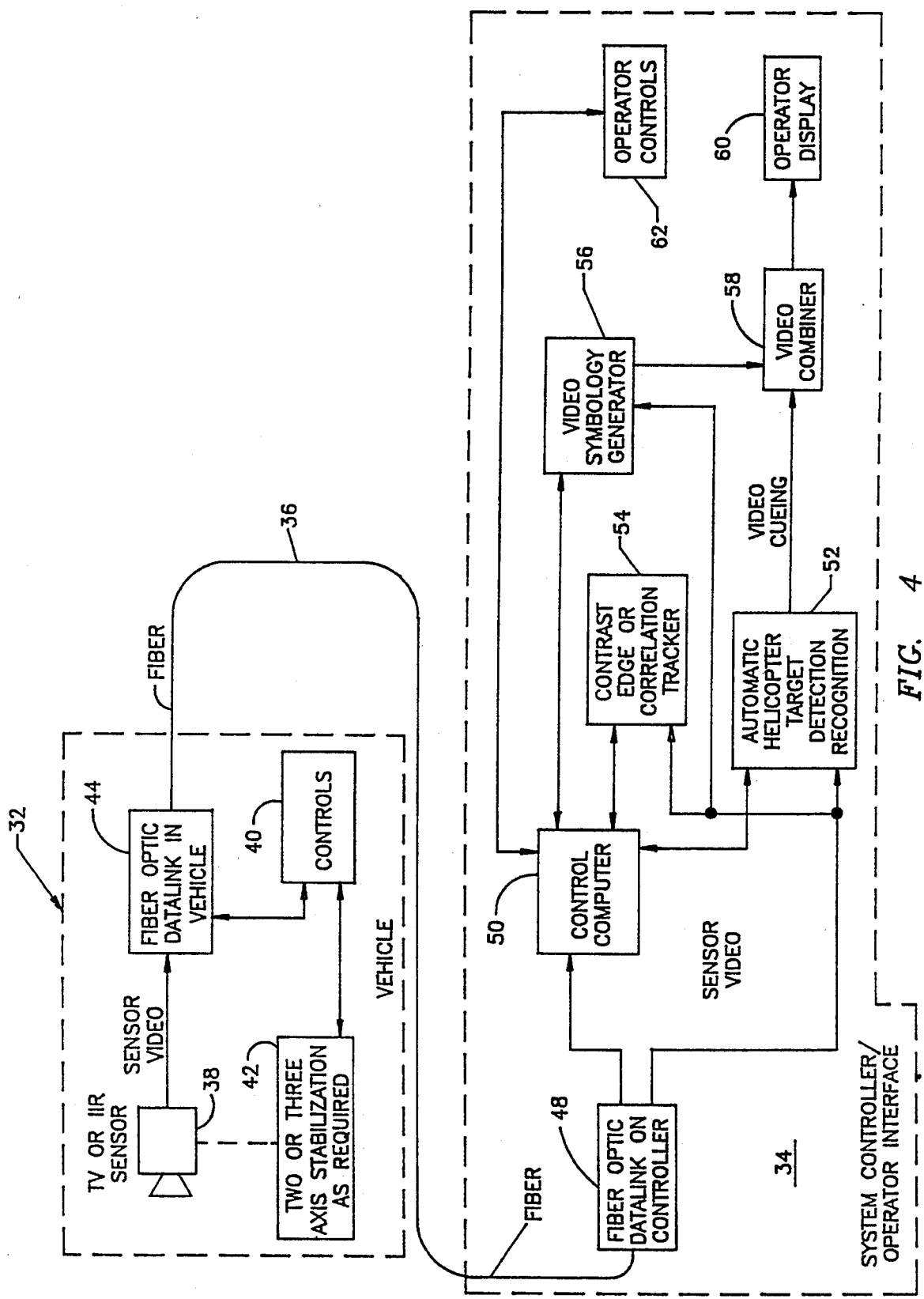
FIG. 4 is a block diagram of the detection and recognition system of the present invention as used in a missile system having fiber optics which connects the missile control system and the video sensor of the present invention with launcher system.

FIGS. 3 and 4 illustrate a missile system 30 utilizing the principles of the present invention discussed above. FIG. 3 illustrates an automatic system which uses a forward observer aircraft 31 to provide the launch system with information relating to helicopter altitude and movement. The missile system 30 is shown to include (FIG. 4), a vehicle 32 being connected to a ground based system controller/operator interface 34 by a fiber optic filament 36, such fiber optic control systems are well known in the art.

As further seen in FIG. 4, vehicle 32 includes a sensor 38 which may be a TV or imaging IR or UV sensor device. The sensor is used to "acquire" the target by picking up the target in its field of view and a control apparatus 40 is provided for controlling the altitude and direction of the missile in flight. A stabilizing system 42, including necessary stabilizing gyros, etc., is connected to control apparatus 40 and sensor 38 for coaction therewith to stabilize the sensor during flight. A fiber optic data link 44 is provided in the vehicle and is connected to the sensor and to the fiber optic filament 36 which is paid out from a bobbin (not shown) mounted in the vehicle.

System controller/operator interface 34 is provided with a fiber optic data link receiver 48 to receive the visual data from sensor 38 carried on the missile. A sensor video output is transmitted from data link receiver 48 to a control computer 50 and to an automatic helicopter target detection/recognition computer 52 which is electrically connected to control computer 50 to send and receive signals therefrom. A contrast edge or correlator tracker 54 is electrically connected to fiber optic data link receiver 48 to receive video output therefrom and to direct signals relative to the sensor video output signals to control computer 50 and to receive signals from control computer 50. The sensor video output signals are also directed to a video symbology generator 56 which is electrically connected to control computer 50 to receive and direct signals thereto. The signals from control computer 50 which are received in video symbology generator 56 are combined with the received sensor video signals to provide video input signals to a video combiner 58 which combines these signals with video signals from computer 52 and directs this video information to an operator display 60.

To provide for operator control of the system, an operator control panel 62 is connected to control computer 50 to receive signals therefrom and to transmit control signals thereto. The operator thus monitors the video signals on the display to identify the target and to determine if the target is friend or foe as described hereinbelow.

Figure 5A:
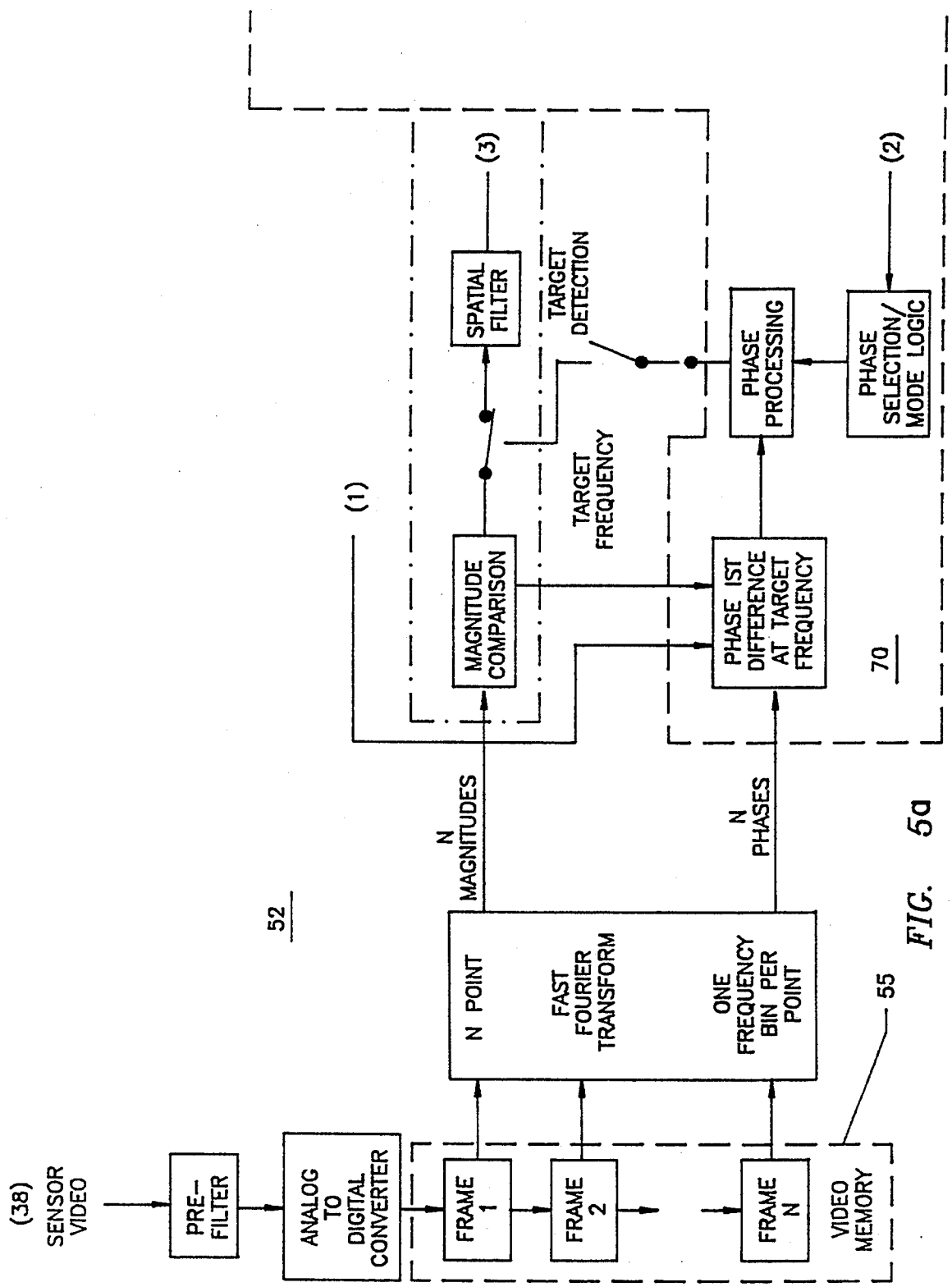
FIGS. 5 a and 5b are block diagrams illustrating the steps performed in the automatic helicopter target detection/recognition system of FIG. 4.
Figure 5B:
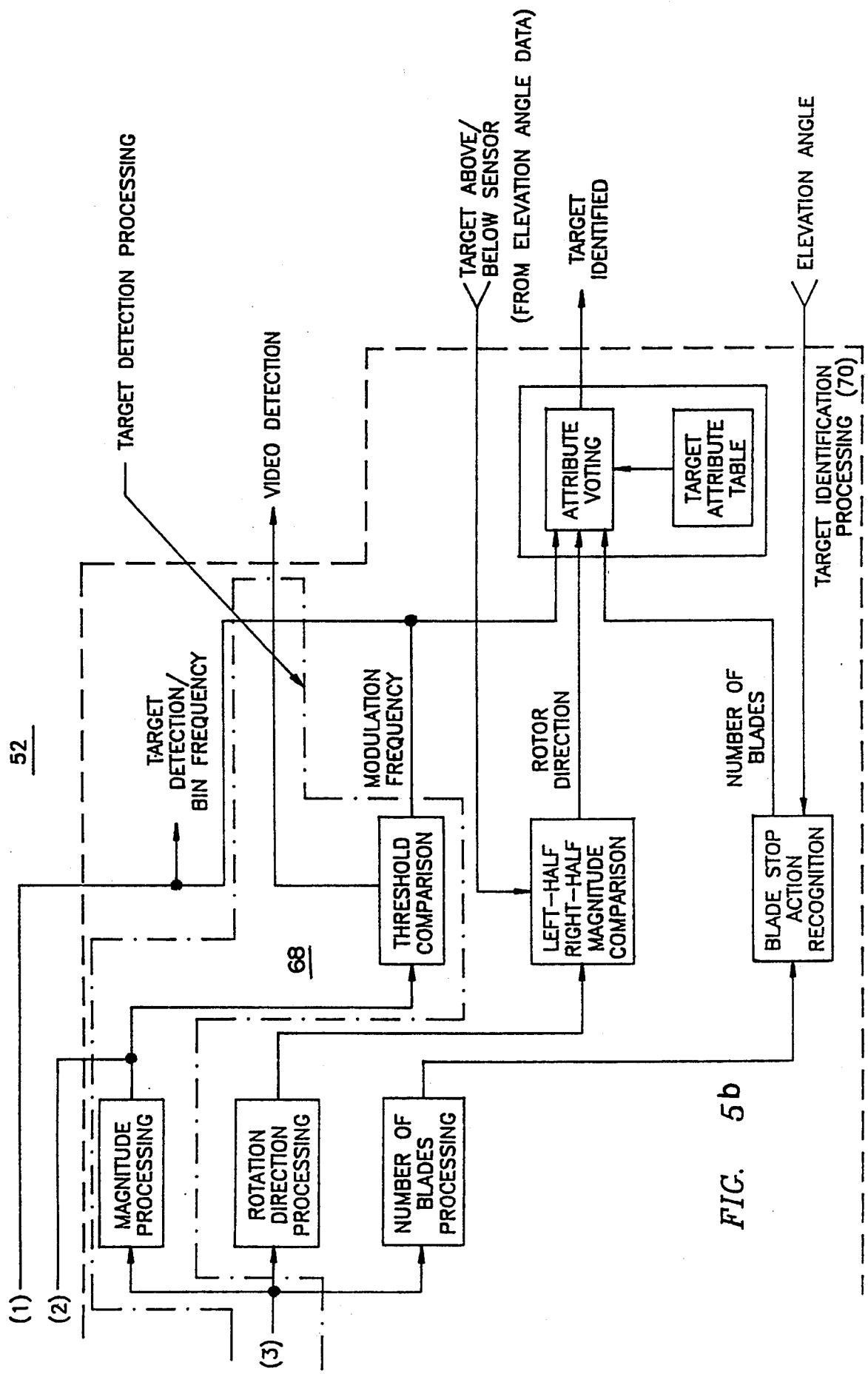

FIG. 5 is a block diagram (flow chart) illustrating the various functions performed in the automatic helicopter target detection/recognition computer 52 illustrated in FIG. 4, which is shown to include a target detection processor 68 and a target identification processor 70. As seen in FIG. 5, sensor 38 transmits video information which is pre-filtered and analog to digitally converted and directed to a video recovery (memory 55) of computer 52 where the required number of fields or frames (Frames 1-frame n) are processed on a pixel basis as discussed supra in accordance with the algorithm illustrated in FIG. 6.

Information received from the video memory are filtered via the Fast Fourier transform (one frequency bin per point) to provide both magnitude and phase output and magnitude and phase comparisons are made. After comparison, magnitude information is spatially filtered and subjected to magnitude processing, rotation direction processing and number of blades processing while the phase information relative to the phase first difference at target frequency is phase processed. Information relative to magnitude processing is combined with a phase selection (mode logic) step and processed with the first difference at target frequency phase. This phase information is spatially filtered and processed along with the magnitude processing relative to rotation direction processing and number of blades processing.

The target identification processor receives target signal information which has been magnitude processed and subjects these signals to a threshold comparison which provides signals to video combiner 58. These threshold compared signals also provide modulation frequency signals which are processed in an attribute voter.

The threshold is set based upon a noise false alarm rate and a probability of detection criteria. If a pixel (picture element) is above the threshold, it is a target element. If the pixel is below the threshold it is set to zero and rejected.

Figure 7:
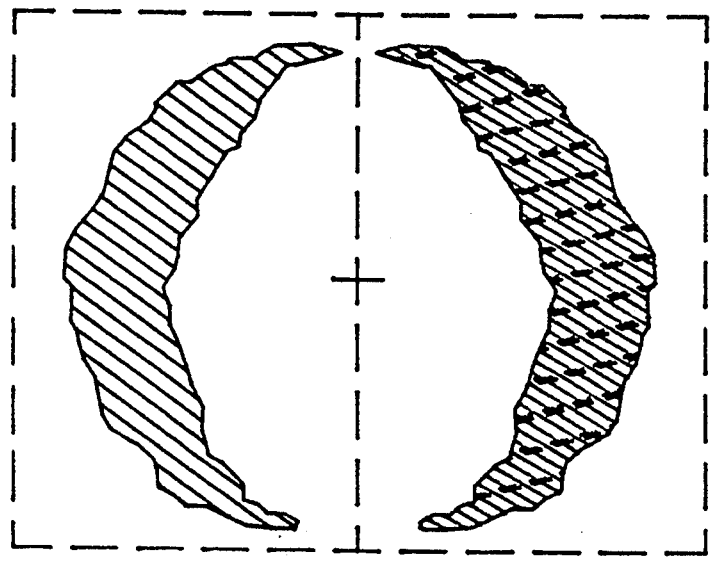
FIG. 7 is a diagrammatic pictorial view as seen on the video monitor of the present invention which illustrates the direction of rotation of the target helicopter rotor.

A simple rotation direction processing algorithm includes isolating and dividing the output from either the detection magnitude processing or the phase/magnitude processing. When the system observes from above the target rotor plane a larger frequency modulation results from the receding rotor blade. However, when the system observes from below the target rotor plane, a smaller frequency modulation results. For example, for a clockwise turning rotor (referenced somewhat above the rotor plane) the left half of the rotor signature is brighter than the right half (see FIG. 7). Tests have shown that the average intensity of the left half (in this example) is often more than two times brighter than the intensity for the right half. This feature reverses for counter clockwise rotation and for view from below the plane of rotor rotation. Signals which are generated in response to left-half, right-half comparison are processed for attribute voting (discussed hereinbelow).

Figure 8:
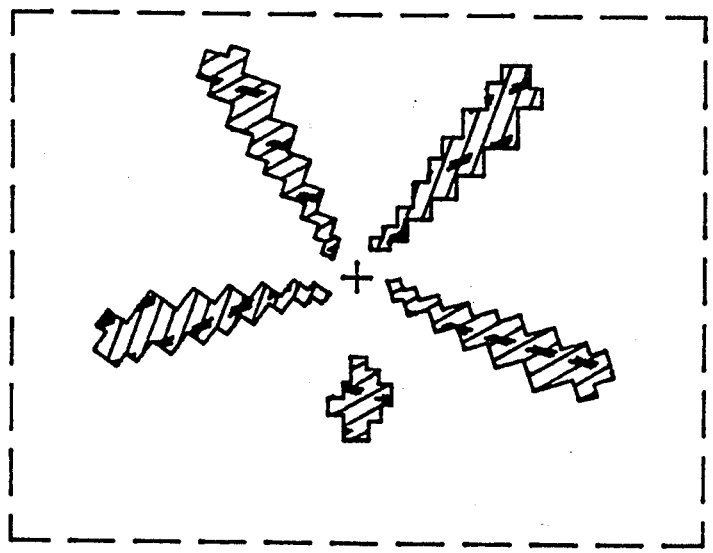
FIG. 8 is a diagrammatic pictorial view as seen on the video monitor of the present invention which illustrates determining the number of blades of the target helicopter and also illustrates an alternative method for determining the direction of rotation.

The blade stop action recognition process provides a pattern recognition function wherein the processor determines the number of helicopter blades. The elevation angle permits the normalization of the geometry to simplify the pattern recognition process for determining the number of blades. FIG. 8 illustrates the input to the blade stop action function from the number of blades processing function. As can be seen in FIG. 5 attribute voting is accomplished on signals relating to modulation frequency, rotor direction, number of blades, and phase first difference at target frequency processing and feedback signals relating to the target frequency related first phase difference is also provided for attribute voting. Target information derived from a target attribute table is also processed with the above identified attribute voted information to identify the target.

Target attribute voting refers to the three target attributes or features. The rotor frequency, the rotor direction and the number of rotor blades. A target attribute table is stored in the memory of computer 52 and contains the apriori feature parameters for all expected helicopter targets. Attribute voting compares the measured target features with the apriori table features to identify the target. Table A shows the Russian HIND and the U.S. Apache attributes.

| TARGET TYPE | MODULATION FREQUENCY | ROTOR DIRECTION | NUMBER OF BLADES |
| --- | --- | --- | --- |
| HIND | 19.7 | CW | 5 |
| APACHE | 19.1 | CCW | 4 |

If the modulation frequencies are close together and tolerances overlap, the other features (rotor director and number of blades) provide for unambiguous target identification.

It is to be understood that the target above/below sensor (FIG. 5) provides a means to determine whether the rotor plane is above the observer (sensor/processor) or below the observer. For a ground observer normally the target is above the sensor 38 and for an airborne observer the sign of the elevation angle of the above/below sensor corrected for flight vehicle altitude of the sensor 38 line of sight determine the operation of the above/below sensor. Vehicle altitude information is received from on board altitude control mechanisms as is well known in the art.

We claim:

1. A system for detection and identification of a helicopter, said helicopter including a rotor having a characteristic signature including modulated electromagnetic signals containing phase and magnitude information, said system for detection and identification of said helicopter comprising:

detection means including video imaging means for detecting and acquiring said helicopter said detection means disposed for generation of video output signals containing said phase and magnitude information;

temporal filtering means for receiving and temporally filtering said video output signals generated by said detection means; and identification means for receiving said temporally filtered video output signals and for comparing said temporally filtered signals with reference signals for identifying said helicopter.

2. A system as set forth in claim 1 wherein said detection means includes magnitude processing means to process magnitude information from said signature to determine the magnitude of said video output signals and phase processing means to process phase information from said signature to determine the frequency of rotation of said rotor.

3. A system as set forth in claim 2 including means for determining the direction of rotation of said blades of said rotor.

4. A system as set forth in claim 2 including means to determine the number of blades of said rotor to determine the identification of said helicopter.

5. A system as set forth in claim 1 wherein said temporal filtering means is a Fast Fourier Transform filter.

6. A system as set forth in claim 1 wherein said temporal filtering means is a digital Fourier transform filter.

7. A system as set forth in claim 1 wherein said temporal filtering means is a finite impluse response filter.

* * * * *